United States Patent Office 2,991,845
Patented July 11, 1961

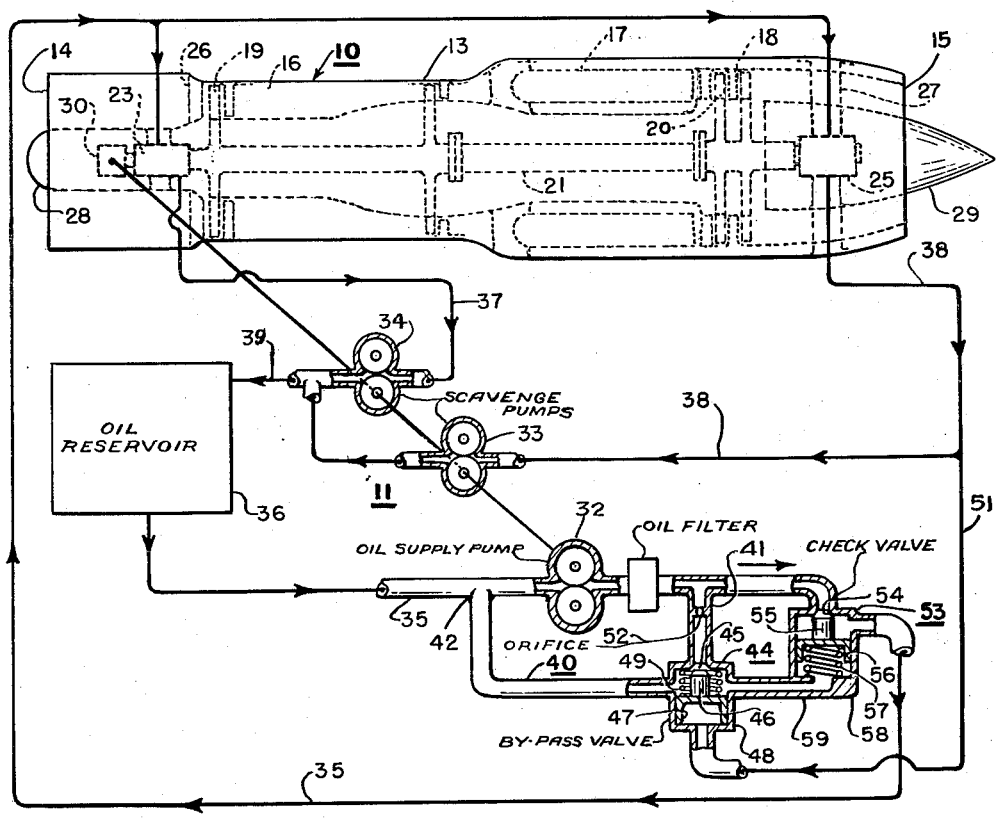

2,991,845
LUBRICATION SYSTEM FOR A GAS TURBINE ENGINE

Paul H. Scheffler, Jr., Kansas City, Mo., assignor to Westinghouse Electric Corporation, East Pittsburgh, Pa., a corporation of Pennsylvania
Filed Apr. 10, 1959, Ser. No. 805,556
6 Claims. (Cl. 184—6)

This invention relates to bearing lubrication systems, more particularly to systems for lubricating the bearings of gas turbine engines and has for an object to provide an improved lubrication system of this type.

It is a further object of the invention to provide a lubrication system for an aviation gas turbine engine in which scavenging of the lubricant fluid from the bearings of the engine is effectively obtained at low engine speeds, such as during starting, shutdown or during "wind milling" of the engine rotor.

In aviation gas turbine engines, it has heretofore been difficult to provide positive scavenging of the lubricated components at low engine speeds, because the lubricant supply pump delivers lubricant at a rate generally proportional to engine speed while the scavenge pumps are much less effective at low engine speeds because of entrained air in the scavenged lubricant forming emulsions which are difficult to remove from the lubricated components and scavenge conduits.

In view of the above, it is a further object of the invention to provide a fluid lubricant system for an engine of the above type, wherein at low engine speeds some of the lubricant is diverted from the main supply conduit in such a manner that the lubricant is delivered to the ingine components at a sufficiently reduced rate to permit effective scavenging by the scavenge pumps.

Another object of the invention is to provide a lubricating system of the above type, in which the fluid lubricant is diverted, as required, from the lubricating components of the engine at low engine speeds while at higher engine speeds full flow of lubricant is provided to the engine components.

In accordance with the invention, there is provided a fluid lubricant supply system for the bearings of an engine, such as an aviation gas turbine engine, which system comprises an oil reservoir, a main conduit structure for conveying the lubricant fluid from the reservoir to the bearings of the engine, an engine driven supply pump interposed in the main conduit, a check valve disposed in the main conduit downstream of the supply pump, a bypass conduit having one end communicating with the outlet of the supply pump and its other end communicating with the inlet of the supply pump, and a bypass valve biased in opening direction and interposed in the bypass conduit.

The bypass conduit is further provided with a flow restricting means disposed upstream of the bypass valve, thereby to provide a fluid pressure drop in the bypass conduit. Both of the valves may be of the piston actuated poppet type and the check valve has the lower face of its piston disposed in communication with the bypass conduit.

In addition thereto, the return or scavenge conduits from the engine bearings are disposed in communication with the fluid reservoir and one of more engine driven scavenge pumps are interposed therein for scavenging the lubricant from the bearings. The fluid pressure in the return conduits is directed to the lower face of the bypass valve piston by a suitable branch or vent conduit.

In operation, at low engine speeds such as during starting, the fluid flow through the supply pump is at such a low value that it readily flows through the restricting means in the bypass conduit and past the bypass valve back to the inlet of the supply pump. Under such conditions, all of the lubricant fluid recirculates about the supply pump with little pressure drop and substantially no fluid is delivered to the engine bearings past the check valve. However, at such low speed operation the bearings contain sufficient lubricant fluid to permit safe operation.

As the speed of the engine is increased, the fluid flow rate of the supply pump increases in proportion to the speed of the engine until the pressure drop across the restricting means is sufficiently large to move the check valve in opening direction, thereby initiating fluid flow through the supply conduit to the bearings in sufficient volume to permit adequate lubrication of the bearings and removal of heat therefrom. Concomitantly therewith, the scavenge pumps are effective to draw the fluid from the bearings and return it to the reservoir.

As the engine speed further increases, the check valve moves to the fully open position and the pressure of the fluid in the return conduits upstream of the scavenge pumps increases in proportion to the engine speed. Such increase in fluid pressure is transmitted through the vent conduit to the bypass valve, moving the latter in closing direction and blocking fluid flow through the bypass conduit. Thereafter the lubricating fluid is delivered to the engine bearings at full flow rate.

With this arrangement, no lubricating fluid is delivered to the engine during starting, at relatively low flow rates during low speed operation, and at high flow rates in the higher speed range of the engine. Accordingly, in the low speed range sufficient flow is provided to permit adequate lubrication, whereas in the higher speed range the fluid flow rate is increased to provide maximum cooling of the bearings, as well as lubrication. Hence, during such low speed operation the scavenge pumps are prevented from being unnecessarily overloaded and adequately scavenge the emulsified lubricant from the system.

The foregoing and other objects are effected by the invention as will be apparent from the following description and claims taken in connection with the accompanying drawing forming a part of this application, in which:

FIG. 1 is a schematic view illustrating a typical aviation turbojet engine having incorporated therewith a fluid lubricating system in accordance with the invention; and FIG. 2 is a graph illustrating the method of operation of the lubrication system.

Referring to FIG. 1 of the drawing in detail, there is shown a gas turbine engine 10 having a fluid lubricant system 11 formed in accordance with the invention.

The engine 10 forms no part of the invention and may, for example, be an aviation turbojet engine of any suitable type. However, as well known in the art, such an engine generally comprises a tubular outer casing 13 having a forwardly directed air intake opening 14 and a rearwardly directed exhaust gas outlet 15. The casing 13 has enclosed therein a compressor section 16, a fuel combustion section 17 and a turbine section 18. The turbine and compressor sections 16 and 18 are conventionally disposed at opposite ends of the combustion section and are provided with bladed rotors 19 and 20 connected to each other for joint operation at variable speed by a shaft 21 and rotatably supported at both ends by suitable bearings 23 and 25. The bearings 23 and 25 may be of any desirable type and are supported in the casing 13 by suitable strut structures 26 and 27. The front bearing 23 and the rear bearing 25 are enclosed and protected by suitable fairing structures 28 and 29. The forward fairing member 28 further encloses suitable power take-off mechanism 30 driven by the engine rotor structure.

In accordance with the invention, the fluid lubricant system 11 comprises a supply pump 32 and a pair of scavenge pumps 33 and 34 drivenly connected to the power take-off mechanism 30 so that they operate at speeds proportional to the speed of the engine 10. For illustration purposes, the pumps have been shown as being of the gear type. There is further provided a main or supply conduit structure 35 having the supply pump interposed therein and connected at its upstream end to a suitable reservoir 36 containing lubricant fluid and at its other end to the bearings 23 and 25 of the engine. Fluid supplied to the bearings 23 and 25 is returned to the reservoir 36 by scavenge or return conduits 37 and 38, connected to the scavenge pumps 33 and 34, and a common scavenge or return conduit 39, communicating with the outlets of both scavenge pumps 33 and 34 and the reservoir 36.

A bypass conduit structure 40, having one end 41 communicating with the main conduit downstream of the supply pump 32 and having another end 42 communicating with the main conduit upstream of the supply pump, is provided for recirculating fluid through the supply pump, in a manner subsequently to be fully described.

A bypass valve 44 having a port 45 and a movable poppet valve member 46 for controlling flow through the port 45 is disposed in the bypass conduit 40. The bypass valve 44 illustrated is preferably, though not essentially, of the piston actuated type and the movable valve member 46 is connected to a piston member 47 which is slidably supported in a chamber formed in the valve housing 48. The movable valve member 46 is biased to an open position by a helical spring 49. The bottom surface of the piston 47 is subject to pressure of the fluid in the scavenge line 38 which pressure is transmitted thereto by a branch or vent conduit 51. Upstream of the bypass valve 44 there is provided a restricted orifice 52 for providing pressure drop during fluid flow from the main conduit 35 through the bypass conduit 40 above certain flow rate values.

A check valve 53 is interposed in the main conduit 35 downstream of the bypass conduit 40 for regulating fluid flow through the main conduit to the bearings 23 and 25. The check valve 53 preferably is also of the piston actuated type and comprises a port 54 controlled by a movable poppet valve member 55 which is mounted on a piston member 56 and biased in closing direction by a spring 57. The piston 56 is slidably supported within a chamber formed in a valve housing 58, and the chamber portion below the lower face of the piston is vented to a region of reduced pressure, for example, to the main conduit 35 upstream of the supply pump 32, by a conduit 59. In the illustration, the conduit 59 is in communication with the bypass conduit 40 and the inlet of the pump 32 through the bypass valve 44. Hence, incipient leakage of lubricant fluid past the piston 56, if any, is maintained in the system.

The fluid lubricant system 11, as shown in FIG. 1, is in the position attained when the engine is operated at low speed such as incurred, for example, during starting. During this phase of operation, the fluid output of the supply pump 32 is relatively low so that flow through the orifice 52 is relatively unimpeded. This flow continues through the open port 45 of the bypass valve and through the bypass conduit 40 to the inlet of the supply pump. Hence, the check valve 53 remains in the closed position and prevents the fluid from flowing through the conduit 35 to the engine bearings 23 and 25. The recirculation flow through the bypass conduit 40 may be regulated as desired by proper selection of orifice size, valve piston area and spring bias. However, in the example shown, as illustrated in FIG. 2, wherein lubricant fluid flow through the engine bearings is illustrated by the solid line curve 60 and bypass lubricant fluid flow is illustrated by the dotted line curve 61, the system is arranged to permit full pump fluid flow through the bypass conduit until the engine speed attains about 15 percent of its maximum rated speed.

As the engine accelerates through the starting range from 15 percent speed to 50 percent speed, the output of the supply pump 32 increases in direct proportion to the speed of the engine, so that the orifice 52 is no longer able to freely accommodate the entire flow therefrom. The subsequent pressure drop across the orifice will cause the check valve 53 to move in opening direction against the bias of spring 57, thereby to initiate fluid flow through the engine bearings, as illustrated by curved portion of the curve 60. During this phase of operation, the output of the pump 32 is divided, with an increasing portion of the pump output being delivered to the bearings, and a decreasing portion of the pump output being bypassed, until, at about 50 percent rated speed, the full output of the supply pump 32 is delivered to the engine bearings 23 and 25. The bypass flow is decreased as the speed of the engine rises above about 25 percent rated speed, since the bypass valve 44 is urged in closing direction by the increasing pressure signal transmitted thereto through the vent conduit 51. This increasing pressure signal is caused by increasing operating pressure of the engine 10 at the increased engine speed, which engine pressure is imposed upon the rear bearing 25 and thence to the scavenge conduit 38.

At 50 percent speed, the pressure drop across the check valve is effective to miantain the check valve in the fully open position. Concomitantly therewith, the engine operating pressure increases sufficiently to provide an increase in pressure in the rear bearing 25 and the scavenge conduits 37 and 38 and the resulting pressure signal, transmitted through the vent conduit 51 to the bypass valve 44, is effective to move the bypass poppet valve member 46 in closing direction to block the port 45. Fluid flow through the bypass conduit 40 is thus interrupted, as indicated by curve 61, and full fluid flow to the bearings is initiated, as indicated by the straight line portion of curve 60. Thereafter, as the speed of the engine is increased to its full rated value, the lubricant fluid flow through the engine bearings is increased as determined by the output characteristics of the supply pump 32.

It will be noted that the check valve 53 is so proportioned that the area of the poppet valve member 55 is smaller than the area of the piston member 56. Hence, after the poppet valve member 55 moves in opening direction and after pressure in the conduit 35 downstream of of the supply pump 32 is established, the piston member is subjected to this established pressure. Accordingly, the poppet valve member 55 will be maintained in the open position even at a lower pressure.

During shutting down operation of the system, the above sequence of operations is merely reversed.

It will now be seen that the invention provides a fluid lubricant supply system for a gas turbine engine which is effective to deliver lubricant fluid to the engine bearings in the optimum manner. More specifically, there is provided a lubricant system wherein at low engine speeds the lubricant is diverted from the engine bearings in the desired degree to prevent overloading the scavenge pumps, and as the engine speed increases to a value wherein considerable heat is developed in the engine bearings full fluid flow is delivered thereto to rapidly remove the heat therefrom as well as to provide sufficient lubrication.

While the invention has been shown in but one form, it will be obvious to those skilled in the art that it is not so limited, but is susceptible of various changes and modifications without departing from the spirit thereof.

What is claimed is:

1. A system for circulating fluid lubricant to the bearings of a rotary power conversion machine comprising a reservoir, main conduit structure for conveying the fluid from said reservoir to the bearings of said machine, a supply pump interposed in said conduit structure, a bypass conduit having one end communicating with the inlet of said pump and another end communicating with the outlet of said pump, a normally open valve disposed in said bypass conduit for controlling recirculation of fluid about said pump, means for restricting fluid flow through said bypass conduit, a normally closed check valve disposed in said main conduit structure downstream of said pump for controlling fluid flow to the bearings, a return conduit for conveying the fluid from the bearings to said reservoir, a scavenge pump interposed in said return conduit, and a branch conduit connected at one end to said return conduit and at its other end to said normally open valve, the fluid pressure transmitted through said branch conduit being effective to move said normally open valve in closing direction.

2. A system for circulating fluid lubricant to the bearings of a variable speed rotary power conversion machine comprising a reservoir, main conduit structure for conveying the fluid from said reservoir to the bearings of said machine, a supply pump having an inlet and an outlet connected to said conduit structure, said supply pump being drivenly connected to said machine, a bypass conduit having one end communicating with the pump inlet and another end communicating with the pump outlet, a bypass valve disposed in said bypass conduit for controlling recirculation of fluid about said pump, means for restricting fluid flow through said bypass conduit, means for biasing said bypass valve in opening direction, a check valve disposed in said main conduit structure downstream of said supply pump for controlling fluid flow to the bearings, means for biasing said check valve in closing direction, a return conduit for conveying the fluid from the bearings to said reservoir, a scavenge pump interposed in said return conduit, said scavenge pump being drivenly connected to said machine, and a vent conduit connected at one end to said return conduit upstream of said scavenge pump and at its other end to said bypass valve, the fluid pressure transmitted through said vent conduit being effective to move said bypass valve in closing direction as the speed of said engine attains a preselected value.

3. A system for circulating fluid lubricant to the bearings of a variable speed gas turbine engine comprising a fluid reservoir, main conduit structure for conveying the fluid from said reservoir to the bearings of said machine, a supply pump driven by said engine and having an inlet and an outlet connected to said conduit structure, a bypass conduit having one end communicating with the inlet and another end communicating with the outlet of said pump, a bypass valve disposed in said bypass conduit for controlling recirculation of fluid about said pump, means for biasing said bypass valve in opening direction, means for restricting fluid flow to said bypass valve, a check valve disposed in said main conduit structure downstream of said pump for controlling fluid flow to the bearings, means for biasing said check valve in closing direction, a return conduit for conveying the fluid from the bearings to said reservoir, a scavenge pump driven by said engine and interposed in said return conduit, and a branch conduit connected at one end to said return conduit and at its other end to said bypass valve, the fluid pressure transmitted through said branch conduit being effective to move said bypass valve in closing direction when the speed of said engine attains a preselected value.

4. In a rotary power conversion machine having a rotor operable at variable speed and bearing structure for rotatably supporting said rotor; a fluid lubrication system comprising a reservoir, a supply conduit for conveying the fluid from said reservoir to the bearing structure, a supply pump driven by said rotor and interposed in said supply conduit, a scavenge conduit for conveying the fluid from the bearing structure to said reservoir, a scavenge pump driven by said rotor and interposed in said scavenge conduit, a bypass conduit having one end connected to the outlet of said supply pump and another end connected to the inlet of said supply pump, means for restricting fluid flow through said bypass conduit, a first valve in said bypass conduit, means for biasing said first valve in opening direction, a second valve disposed in said supply conduit downstream of said bypass conduit, means for biasing said second valve in closing direction, and a vent conduit for transmitting fluid pressure from said scavenge conduit to said first valve in valve closing direction, said fluid pressure being effective to close said first valve when said rotor attains a preselected speed.

5. In a gas turbine engine having a rotor operable at variable speed and bearing structure for rotatably supporting said rotor; a fluid lubrication system comprising a reservoir, a supply conduit for conveying the fluid from said reservoir to the bearing structure, a supply pump interposed in said supply conduit, a scavenge conduit for conveying the fluid from the bearing strutcure to said reservoir, a scavenge pump interposed in said scavenge conduit, means drivenly connecting said supply pump and said scavenge pump to the rotor of said machine, a bypass conduit having one end connected to the outlet of said supply pump and another end connected to the inlet of said supply pump, means for providing a fluid pressure drop in said bypass conduit, a first poppet valve in said bypass conduit, means for biasing said first valve in opening direction, a second poppet valve disposed in said supply conduit downstream of said bypass conduit, means for biasing said second valve in closing direction, said second valve being movable in opening direction when said pressure drop attains a predetermined value, and a vent conduit having one end connected to said scavenge conduit upstream of said scavange pump and having its other end connected to said first valve for transmitting fluid pressure from said scavenge conduit to said first valve in valve closing direction, said fluid pressure being effective to close said first valve after said second valve is moved to an open position.

6. In a gas turbine engine having a rotor and bearing structure for rotatably supporting said rotor; a fluid lubrication system comprising a reservoir, a supply conduit for conveying the fluid from said reservoir to the bearing structure, a supply pump interposed in said supply conduit, a scavenge conduit for conveying the fluid from the bearing structure to said reservoir, a scavenge pump interposed in said scavenge conduit, means drivenly connecting said supply pump and said scavenge pump to the rotor of said machine, a bypass conduit having one end connected to the outlet of said supply pump and another end connected to the inlet of said supply pump, means defining a restricted orifice restricting flow through and providing a fluid pressure drop across said bypass conduit, a first poppet valve disposed downstream of said orifice in said bypass conduit, means for biasing said first valve in opening direction, a second poppet valve disposed in said supply conduit downstream of said bypass conduit for controlling fluid flow to the bearing structure, means for biasing said second valve in closing direction, said second valve being movable in opening direction by fluid pressure when said pressure drop increases to a predetermined value, a first vent conduit for transmitting scavenge fluid pressure from said scavenge conduit to said first valve in valve closing direction, said scavenge fluid pressure increasing with speed of said rotor and being effective at a preselected rotor speed to close said first valve, and a second vent conduit connecting said second valve to said supply conduit upstream of said supply pump.

References Cited in the file of this patent

UNITED STATES PATENTS

| | | |
|---|---|---|
| 2,249,165 | Owner | July 15, 1941 |
| 2,592,140 | Holben et al. | Aug. 8, 1952 |
| 2,642,155 | Wilhelm et al. | June 16, 1953 |